Oct. 12, 1926.  
E. W. DAVIS  
1,602,753  
CONVEYER SYSTEM  
Filed July 19, 1924    2 Sheets-Sheet 1

Inventor:  
Ernest W. Davis  
By Earl × Pierce  
Atty.

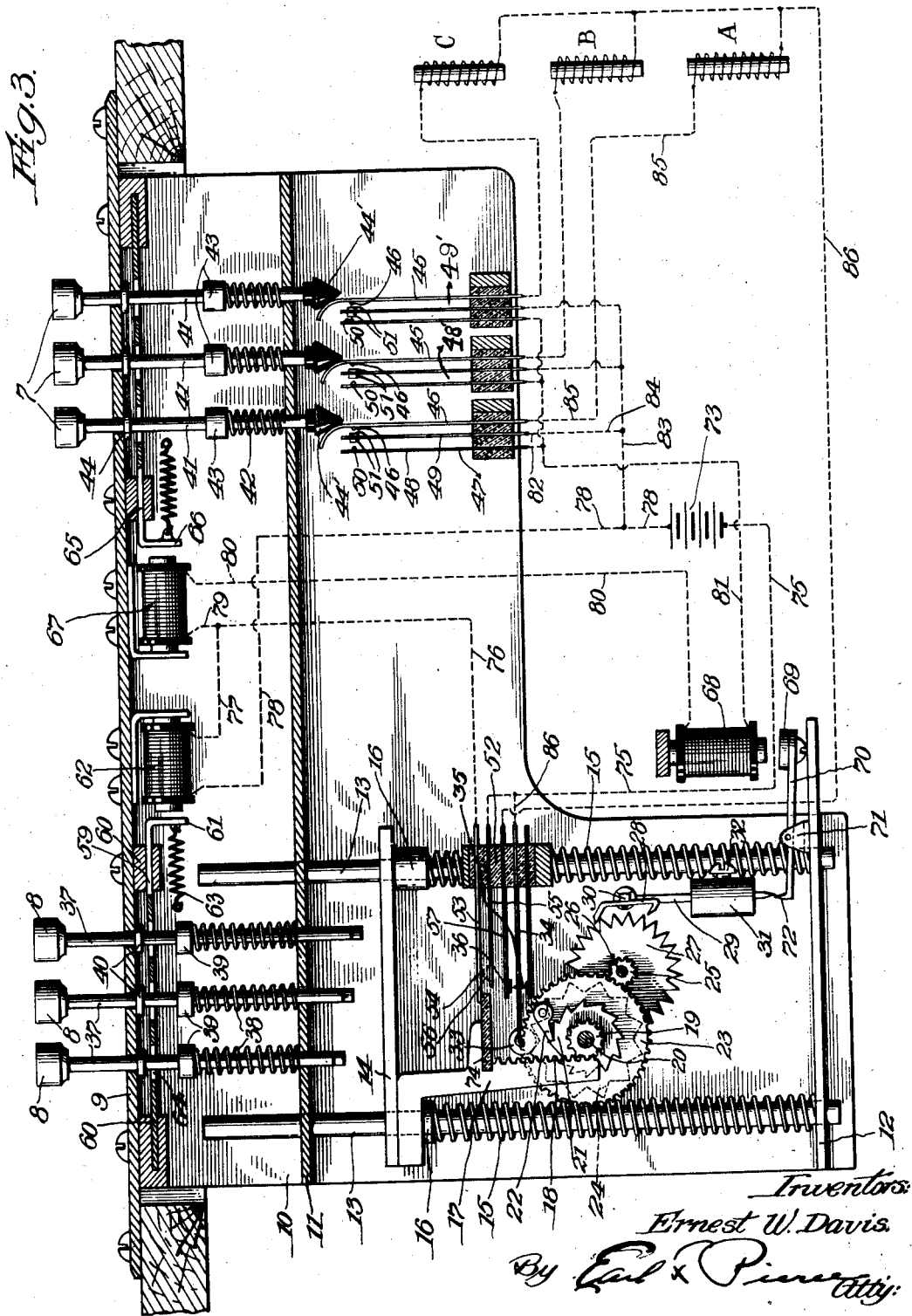

Patented Oct. 12, 1926.

1,602,753

UNITED STATES PATENT OFFICE.

ERNEST W. DAVIS, OF OAK PARK, ILLINOIS, ASSIGNOR TO LOUIS THREEFOOT AND GEORGE W. ELKIN, BOTH OF MERIDIAN, MISSISSIPPI.

CONVEYER SYSTEM.

Application filed July 19, 1924. Serial No. 727,019.

My invention relates to improvements in conveyer systems and is particularly concerned, though not all limited to improvements in conveyer systems of the gravity type.

The objects of my present invention are:

First. To provide a conveyer system comprising a plurality of storage conveyers and a common conveyer, for conveying articles from the storage conveyers to any desired point, and including remote control means whereby the operator can select and have delivered at the desired point, articles from any one, or all, of the storage conveyers.

Second. To provide a conveyer system of the type described, comprising a selector mechanism wherein the operator can enter, or set up, the kind and number of any desired article that he wishes to have delivered, and then permit the selector mechanism automatically to determine, or insure, the delivery of the articles selected.

Third. To provide a conveyer system such as described, in which means are provided for insuring a definite period of time for the delivery of each article from a storage conveyer to the common conveyer, this means being adjustable to vary the duration of the time periods.

Fourth. To provide a system of the character described embodying means for preventing the entry of a second order before all of the articles required by the entry of a preceding order have been delivered.

Fifth. To provide a conveyer system such as described, that is particularly applicable to conveyer systems such as described in the co-pending application of Louis Threefoot and George W. Elkin, Serial Number 727,004, filed July 19, 1924. It is, however, to be clearly understood that my invention is not limited to use in connection with a conveyer system such as described in the foresaid patent application.

Other objects of my invention are to provide a system such as described that is simple in construction, economical to manufacture and reliable.

Figure 1:
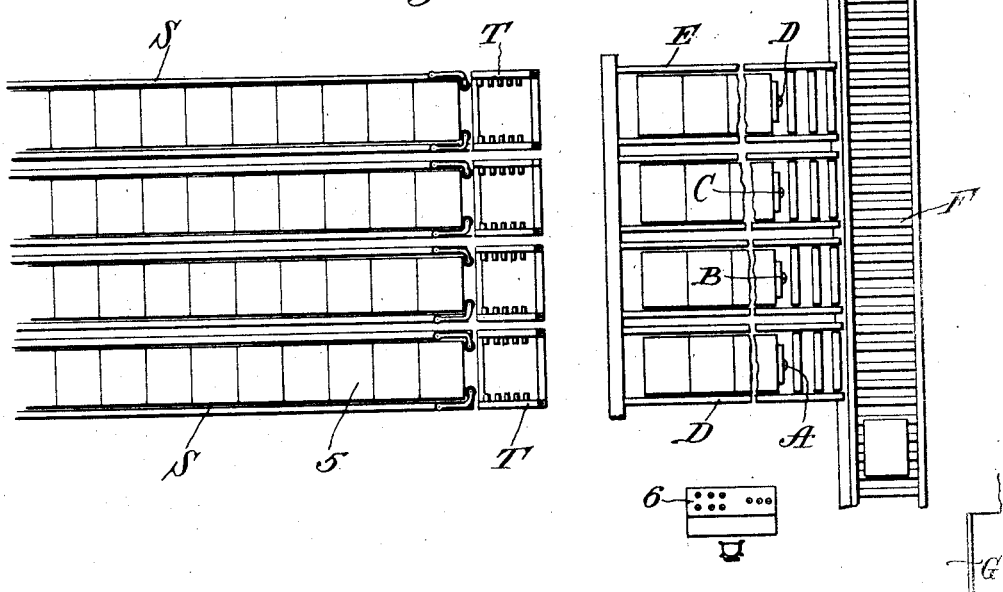

Other objects will appear as this description progresses, reference being had to the accompanying drawings in which Figure 1 is a more or less diagrammatic plan view of a system embodying my invention.

Figure 2:
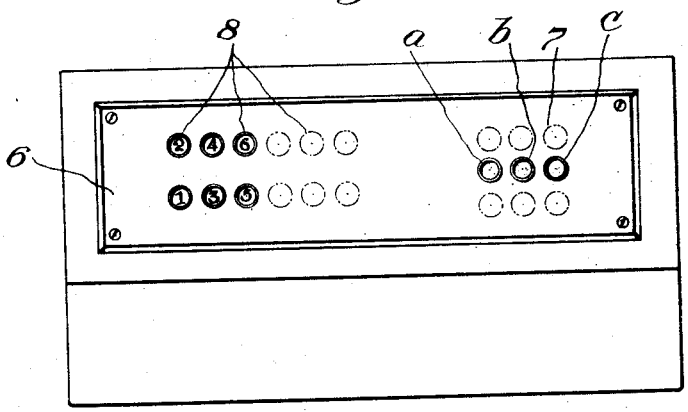

Figure 2 is a plan view of the control forming a part of my system and Figure 3 is a longitudinal section through the control panel, the circuit controlled by this panel being shown in dotted outline.

Referring to the drawings, Figure 1, is as stated above, a more or less diagrammatic view of a system embodying my invention wherein a plurality of storage conveyers S, arranged side by side in parallel relation, each have a plurality of receptacles or containers 5 stacked thereon, in ranks and files. These conveyers are preferably inclined horizontally, and provided with a suitable anti-friction support for the articles or containers so as to insure the delivery of successive files of containers to the transfer devices, or conveyers T, that in turn deliver the cases one by one to the delivery conveyers E.

Solenoid controlled means, A B C and D are provided for controlling the discharge of the articles or containers from the conveyers E onto the common conveyer F. The common conveyer F is designed to deliver all of the articles to a common point, such as a loading platform G having a drive way H at the side thereof, so that the articles can be easily and quickly transferred to a vehicle.

The conveyer such as described may be controlled from a desk or switchboard 6 located adjacent the delivery end of the common conveyer F so that the operator can observe the articles or containers, as they are discharged, and thus make certain that the proper articles are being delivered.

The switchboard or desk shown on an enlarged scale in Figure 2 comprises a plurality of keys 7, which upon being depressed determine from which storage conveyer the articles ordered are to be delivered. For instance, if the operator depresses the key $a$, the solenoid will be connected in circuit with a battery as will be described, so that when any of the keys 8 are depressed a number of the articles will be discharged upon the conveyer corresponding to the number indicated upon the key 8 that is depressed. To make this more clear, if the operator depresses the key a, and then the key 5, five articles held by the conveyer D, controlled by the solenoid A will be delivered to the platform G. If, in place of the key 8 bearing the numeral 5, the key bearing the numeral 2 had been depressed, then only two of the articles would have been discharged. And similarly, if in place of depressing the key a, the operator had depressed the key c, the two articles would have been discharged from the conveyer controlled by the solenoid C.

The selector mechanism embodying the desk or switchboard 6, is shown in vertical section in Figure 3, and comprises the supporting panel 9, from which depend two parallel brackets 10, only one of which is shown. Sub-panels 11 and 12 carried by the brackets 10, provide means for supporting portions of the selector mechanism. A plurality of guide posts or rods 13, are supported by the sub-panels 11 and 12. A plate 14, slidably mounted upon the guide posts 13, is yieldingly held in its uppermost position by means of compression springs 15, confined between the bosses 16, formed integrally with the plate 14, and sub-panels 12.

A bracket 17, is secured to and depends from, the plate 14. One vertical edge of this bracket has a plurality of teeth 18, thereon forming a rack for engaging the teeth of the pinion 19. The pinion 19 is secured to a shaft 20, the opposite ends of which are journaled in the bracket 10. A ratchet wheel 21 is also mounted upon, and rigidly secured to shaft 20, so as to turn with the pinion 19. The teeth of this ratchet are adapted to be engaged by the spring by pressed pawl 22, pivotally mounted upon the gear 23. This gear 23 is rotatably mounted upon the shaft 20, and rigidly connected to the cam wheel 24. The cam wheel 24 rotates upon the shaft 20.

A pinion 25 is mounted upon, and secured to the shaft 26, the opposite ends of which are journaled in the bracket 10. An escapement wheel 27 is also mounted upon the shaft 26. The movement of the escapement wheel 27 is controlled by the verge 28, and the pendulum 29, that is mounted upon any suitable pivotal support. The pendulum weight 31, may be adjusted longitudinally of the pendulum by releasing the set screw 32, so that the length of the period of time elapsing between successive energizations of the solenoid A B C D, etc., may be adjusted.

From the description thus far given, it will be apparent that if the plate 14, is depressed a predetermined distance the rack 18, during the movement of the plate 14, causes the pinion 19 and the ratchet 21 to rotate a corresponding distance in a counter clock-wise direction. If the pressure is then removed from the plate 14, the springs 15 will tend to expand to their normal condition and to return the plate 14 to the position shown in Figure 3. In so doing the rack 18 will be caused to rotate the pinion 19, and the ratchet wheel 21 in a clock-wise direction, but since the pawl 22, engages the teeth of the ratchet 21, the gear 23, and the cam wheel 24, will be rotated in a clock-wise direction in common with the pinion 19, and the gear 23. The rate at which the plate 14 returns to its normal position will, of course, be determined by the action of the escapement wheel 27, and the verge 28, the pendulum 29. If the length of the pendulum is increased, the rate at which the plate is returned will be decreased. As the conveyer wheel moves in clock-wise direction, the teeth will successively lift the roller 33, and thus successively bring the contact 35 into and out of an engagement with the contact 36. Before describing the effect of successively making and breaking contact between the contacts 36 and 35, I shall describe the means for depressing the plate 14 through a predetermined distance that will determine the number of articles that are to be delivered.

This means comprises a plurality of rods 37, that are reciprocally mounted in the panel 9, and the sub-panel 11 and held in their uppermost position by means of compression springs 38 confined between the sub-panel and the collar 39 secured to the rods 37. Other collars 40, are adapted to engage with the panel 9 to limit the upward movement of the rods 37.

The key 8, heretofore referred to, and mounted upon the opposite ends of the rods 37, are provided with suitable indicia for indicating to the operator the number of articles that will be delivered on the depression of the key.

Any number of rods 37 and keys 8, may be used as found desirable. I have herein shown two rows of such keys.

I have illustrated but one row of keys for determining the kind of articles that are to be delivered, or in other words, for determining the storage conveyor from which the articles are to be discharged, but it will, of course, be clear that any number of such keys may be employed. These keys are mounted upon the uppermost ends of the rods 41. These rods are reciprocally mounted on the panel 9 and sub-panels, and are held in their uppermost positions by means of compression springs 42 confined by the sub-panel 11 and the collars 43, carried by the rods 41. Other collars 44 secured to the rods 41, limit the upward movement of these rods. The lower ends of the rods 41 are provided with conical shaped tips 44' made of rubber or other suitable insulating material. These tips are adapted to contact with, and move toward the left, the upper ends of the contact springs 45 each of which carries a contact 46. Contact springs 47 supported by suitable blocks or strips, of insulating material, are arranged in parallel relation with the contact springs 48' and 49' respectively. Each of the contact springs 49 carries a double contact 51 for contacting with contacts 46 and 50 respectively.

Another insulating bar or strip supports the contact spring 53, carrying the contact 54; the contact spring 55 carrying the contact 56; and the contact spring 57 carrying the contact 36. A locking bar 59 is slidably mounted on the supporting strips 60, carried by the panel 9 and one end bends downwardly as shown in Figure 3, to form an armature 61, that is adapted to be attracted by the solenoid 62 carried by the panel 9 when the latter is energized. Tension spring 63, having one end secured to armature 61 and the other end secured to one of the brackets 10 provides means for returning the lock bar to its normal position as shown in Figure 3. The lock-bar 59, is provided with a plurality of openings 64 through which the rods 37 and the collar 40 are adapted to reciprocate. It will, of course, be understood that the lock bar 59 is made of iron, steel or some other magnetic material, so that the armature will have the proper magnetic characteristic; but it would be possible to make use of a lock bar formed of other material having a magnetic armature secured thereto, A similar lock bar, is provided for the rods 41. This lock bar has an armature that is adapted to be actuated by the solenoid 67. Since this construction is similar to that just described, more detailed description is thought to be unnecessary.

Another solenoid 68 is mounted between the two panels 10 and adapted to attract the armature 69 carried by one end of the lever, 70. This lever is pivotally mounted upon any suitable support and carries a detent 72 at the end opposite the armature 69. This detent is adapted to engage the lower end of the pendulum, and prevent the movement thereof, but when the solenoid is energized, so as to lift the armature 69, the detent is released from the lower end of the pendulum so as to permit the latter to oscillate.

In the operation of my selector mechanism, it is preferable to depress the proper key 8 for securing the desired number of articles before one of the keys 7 is depressed. When one of the keys 8, as for instance, the key bearing the indicia number 5 is depressed, the plate 14 will be pushed downwardly against the tension of the spring 15, and cause the ratchet wheel to rotate through a distance substantially equal to five of its teeth.

It will be seen that before the end of the rod 37 supporting the key bearing the indicia 5, contacts with the plate 14, the collar 40 on the rod 37 will have passed through the corresponding opening in the lock bar 59. The movement of the plate in a downwardly direction causes the insulating block 74 carried by the rack 17, to move downwardly out of supporting relation to the contact spring 53, and thus permit the contacts 54 and 56 to close. Thereupon the current flows from the battery 73 through the conductor 75, contact spring 55, contacts 56 and 54 respectively, contact spring 53, conductors 76 and 77, to the solenoid 62, and to return from the solenoid 62 to the battery 73, through the conductor 78. In this manner the solenoid is energized and attracts the armature 61, to a position wherein the opening in the lock bar 54 no longer registers with the collar 40. In this manner the depressed key is held in its depressed position, and the other keys are prevented from being depressed until the solenoid 62 is de-energized. After depressing the key 8 as described, the operator next depresses one of the keys 7 as for instance, the key bearing the indicia $a$. This causes the contacts 46, 50 and 51 controlled by that key to close, and thereby permit the current to pass from the battery 73, through the conductors 75, contact springs 55, contacts 56 and 54, contact springs 53, conductor 76, and conductor 79 to the solenoid 67 through conductor 80, and thence through the solenoid 68 to conductor 81. The current then passes through the contact spring 48 corresponding to the key $a$, contacts 50 and 51 and conductor 82, 83, 84 and 78, back to the battery.

In this manner the solenoids 67 and 68 are energized. The energization of solenoid 67 causes the lock bar 65 to be pulled into position to lock the depressed key against return, and to prevent depression of the remaining keys, it being understood that the contours of the tip 44 and the end of the contact 45, are such as to permit the collar 44 to pass through before the contacts 46 and 51 engage each other.

The energization of the solenoid 68, causes the latter to attract the armature 69, and thus release the pendulum described above. Simultaneously another circuit through the solenoid A is completed as follows:

From the battery 73 through conductors 78, 83 and 84, contact spring 49, contacts 51 and 46, contact spring 45, conductor 85, solenoid A, conductor 86, contact spring 57, contacts 36, 35, contact spring 34, and conductors 86 and 75, back to the battery 73. It will be understood that the solenoids 67 and 68 and solenoid A, are energized substantially simultaneously, and that immediately the pendulum 29 takes control of the discharge of articles from the conveyer controlled by the solenoid A. Each time the solenoid A is energized an article or container is permitted to proceed from a corresponding conveyer E onto the conveyer F. As the rack moves upwardly under the tension of spring 15, and under control of the escapement mechanism, contacts 35 and 36 are brought into and out of, contact with each other, and thus periodically energize and de-energize the solenoid A.

When the plate 14 completes its upward movement the roller 33 drops in between two of the teeth on the cam wheel 24, and the insulating block 74, carried by the rack 17, engages the free end of the contact spring 53 and de-energizes the solenoids 62, 67 and 68, and permitting the lock bars 58 and 65 and the armature 69 to return to the position shown in Figure 3. This permits the two keys to return to their initial positions, and when the key 7 bearing the indicia $a$, returns to its initial position the contacts 46, 50 and 51 are separated. thus restoring the entire apparatus to its initial condition.

The operation for any other set of keys is similar to that described above, and for that reason further description is believed to be unnecessary.

It will be seen that, as stated above, by adjusting the pendulum weight 31, longitudinally of the pendulum, the period of vibration of the pendulum can be varied, and in this manner the periods of time allowed for the discharge of an article from one of the conveyers E, may be varied if desired, or made necessary, by the size or other characteristic of the article.

Wherever, throughout the specification and claims I have made use of the expression "article" or "container" it is to be understood that these words are used synonymously and that they are intended to cover any sort of receptacle box, container or article that can be delivered by a system of the character described herein. It is to be further understood that while I have described the details of construction of the preferred embodiment of my invention, my invention is not limited to these details, but is capable of other adaptations and modifications within the scope of the appended claims.

Having thus described my invention, what I claim is:

1. The combination with a plurality of gravity conveyers, of a common conveyer for receiving containers from said gravity conveyers. an electric solenoid for controlling the discharge of containers from each of said gravity conveyers onto said common conveyers, a source of current for energizing said electric solenoids, a circuit including a switch connecting each of said solenoids with said source of current, means for rendering the remainder of said switches inoperative when one of said switches is closed, interruptor mechanism common to all of said circuits, adjustable means for controlling the rate of operation of said interruptor mechanism, and selector means for determining the number of interruptions to be effected by said interruptor mechanism.

2. The combination with a plurality of storage conveyers, of a common conveyer for receiving containers from said storage conveyers, a circuit including an electric solenoid for controlling the discharge of containers from each of said storage conveyers onto said common conveyer, common set up mechanism for consecutively making and breaking said circuit a predetermined number of times, and means for preventing the energization of the remaining solenoids until after the selected solenoid has been energized the predetermined number of times.

3. The combination with a plurality of storage conveyers, of a common conveyer for receiving the containers from each of said storage conveyers onto said common conveyers, and common set up mechanism for consecutively making and breaking said circuit a predetermined number of times.

4. The combination with a plurality of storage conveyers, of a common conveyer for receiving containers discharged from said storage conveyers, selector means for automatically controlling the discharge of any predetermined number of containers from any one of said storage conveyers onto said common conveyer, and means for preventing containers from being discharged from the remaining conveyers while any one of said conveyers is discharging containers onto said common conveyers.

5. The combination with a plurality of storage conveyers, of a common conveyer for receiving containers discharged from said storage conveyers, and selector means for automatically controlling the discharge of any predetermined number of containers from any one of said storage conveyers onto said common conveyer.

6. The combination with stationary means for holding a plurality of different articles, of means for conveying said articles to a common destination, and common automatic means for determining the delivery of any desired number of selected articles to said conveying means.

7. The combination with a conveyer for holding a plurality of articles, of means for controlling the discharge of containers from said conveyer, comprising a solenoid, and set up mechanism for automatically effecting the repeated energization of said solenoid.

8. The combination with a conveyer for holding a plurality of articles, of set up and delayed action means for automatically effecting the discharge of any desired number of articles from said conveyers.

9. The combination with a plurality of storage conveyers, of means for controlling the discharge from said conveyers, selector means for determining which one of said last named means shall operate, and means for rendering the remaining controlling means inoperative.

In witness whereof, I hereunto subscribe my name this 27 day of June, 1924.

ERNEST W. DAVIS.